(12) United States Patent
Xie et al.

(10) Patent No.: US 7,290,006 B2
(45) Date of Patent: Oct. 30, 2007

(54) DOCUMENT REPRESENTATION FOR SCALABLE STRUCTURE

(75) Inventors: Xing Xie, Beijing (CN); Wei-Ying Ma, Beijing (CN); Hong-Jiang Zhang, Beijing (CN); Liqun Chen, Jiangxi (CN)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 10/676,518

(22) Filed: Sep. 30, 2003

(65) Prior Publication Data

US 2005/0071364 A1  Mar. 31, 2005

(51) Int. Cl.
G06F 17/00 (2006.01)
(52) U.S. Cl. .................. 707/102; 707/101; 707/103 Y; 707/104.1
(58) Field of Classification Search .............. 707/1–10, 707/100–104.1, 200–206; 715/500; 725/136
See application file for complete search history.

(56) References Cited

U.S. PATENT DOCUMENTS

2004/0133927 A1* 7/2004 Sternberg et al. ........... 725/136
2004/0177316 A1* 9/2004 Layzell et al. ............... 715/500
2005/0010583 A1* 1/2005 Clifton-Bligh .............. 707/100

OTHER PUBLICATIONS

An Evolutionary Approach to Support Web Page Design: Fuchs, Matthias; Australian National University, Computer Sciences Laboratory; Technical Report TR-ARP-01-2000, Jan. 4, 2000, 14 pages.

"Information presentation on mobile handhelds" Karstens, B., et al.; University of Rostock, Computer Science Department, http://wwwicg.informatik.uni-rostock.de/~schumann/papers/2002+/IRMA2003-karstens.pdf, 2003.

Function-Based Object Model Towards Website Adaptation: Chen, Jinlin, et al.; WWW10, May 1-5, 2001, Hong Kong, ACM 1-58113-348-0/01/0005, pp. 587-596.

"Power Browser: Efficient Web Browsing for PDAs" Buyukkokten, Orkut, et al.; Stanford University, Digital Libraries Lab., 2000, 8 pages.

"WEST: A Web Browser for Small Terminals" Bjork, Staffan, et al.; http://www.sics.se/~jussi/Artiklar/1999_UIST_Asheville/west.pdf, 1999.

"Constraint Cascading Style Sheets for the Web" Badros, Greg J., et al.; Technical Report UW CSE 99-05-01, May 7, 1999, 10 pages.

(Continued)

*Primary Examiner*—Diane D Mizrahi
(74) *Attorney, Agent, or Firm*—Lee & Hayes, PLLC

(57) ABSTRACT

An exemplary system includes a browser to browse a web page based on a web page definition having a slicing tree defining an arrangement of rectangular regions in the web page. The web page definition can include parametric data describing adaptability parameters associated with a rectangular region. A rendering module renders an adapted web page based on the web page definition, and a proxy module generates an intermediary adapted web page definition. A method includes rendering the web page according to a slicing tree and block property data in an associated web page definition. The method may include determining a set of unsummarized blocks that maximize information fidelity.

10 Claims, 7 Drawing Sheets

OTHER PUBLICATIONS

"Web Newspaper Layout Optimization Using Stimulated Annealing" Gonzalez, Jesus, et al.; IEEE Transactions on Systems, Man, and Cybernetics—Part B: Cybernetics, vol. 32, No. 5, Oct. 2002, pp. 686-691.

"Digestor: Device-independent Access to the World Wide Web" Bickmore, Timothy W., et al.; FX Palo Alto Laboratory, http://decweb.ethz.ch/WWW6/Technical/Paper177.html, Mar. 24, 2000; 10 pages.

Constraint-based document layout for the "Web" Borning, Alan, et al.; Multimedia Systems 8 Springer-Verlag 2000, pp. 177-189.

Bickmore, Timothy W. and Schilit, Bill N.; "Digestor: device-independent access to the World Wide Web"; Computer Networks and ISDN Systems 29 (1997) p. 1075-1082.

* cited by examiner

DOCUMENT REPRESENTATION FOR SCALABLE STRUCTURE

TECHNICAL FIELD

The described subject matter relates to information presentation. More particularly, the subject matter relates to scalably and adaptively representing a document.

BACKGROUND

In recent years, the internet has grown extremely quickly both in terms of use and the amount of information provided. Information on the internet is typically provided in the form of electronic documents, such as 'web pages,' which can present text, pictures, graphics, sounds, video, hyperlinks, and other content to a user. Users are increasingly accessing the internet from devices, other than, or in addition to, desktop computers (e.g., handheld computers, personal digital assistants (PDAs), cell phones, etc.). Many of these devices have display screens with non-traditional dimensions, which differ from dimensions of a traditional pdesktop computer display screen. Because many web pages are developed for presentation on a traditional desktop computer monitor, presentation of such web pages is often less than ideal on these non-traditional display screens.

For example, a desktop computer typically uses a relatively large monitor having a viewable display area greater than 15 inches. A web page developed for such a display screen can include large amounts of information, which are often arranged in a number of rectangular regions called blocks (also called information blocks or content blocks). Each of the blocks may have related data items, which may or may not be selectable by the user.

For example, one block may include a table of contents for a web site, another block may include pictures (e.g., thumbnails), and another block may include a number of selectable hyperlinks, such as news headlines. On a traditional display screen, such large amounts of information may appear almost exactly as the web page creator originally intended. However, on smaller, non-traditional display screens, the rendering process can make the large amounts of information appear very small, unreadable, or otherwise less than ideal.

One possible solution is to write a separate style sheet for every type of device and/or display screen. However, such an approach could be very labor intensive, due to the great variability of some application parameters (such as window sizes and display device sizes). In addition, such an approach would not easily be able to account for advancements and changes in devices and display devices.

SUMMARY

Implementations described and claimed herein solve the discussed problems, and other problems, by providing a document representation format to facilitate scalable web page structure. Web page content may be adapted to a display size by extracting information from the content in accordance with a layout optimization rule using a document representation structure in the web page definition.

An exemplary system includes a browser to browse a web page based on a web page definition having a slicing tree defining an arrangement of rectangular regions in the web page. The web page definition can include parametric data describing adaptability parameters associated with a rectangular region. A proxy module generates an intermediary adapted web page definition and a rendering module renders the adapted web page based on the adapted web page definition.

A method includes rendering the web page according to a slicing tree and block property data in an associated web page definition. The method may include determining a set of unsummarized blocks that maximize information fidelity.

DETAILED DESCRIPTION

Overview

Exemplary methods, systems, and devices are disclosed for electronic document representation for scalable structure (DRESS). An electronic document, such as a web page definition, is defined with DRESS information and made available for browsing. Using the DRESS information, the web page can be efficiently scaled and/or adapted to various display sizes and/or window sizes. DRESS enables information providers, such as web page authors, to make composite documents, such as web pages, scalable in both logic and layout structure to support effective information acquisition and presentation in heterogeneous environments.

Exemplary Systems for Developing and Rendering a Web Page

Figure 1:
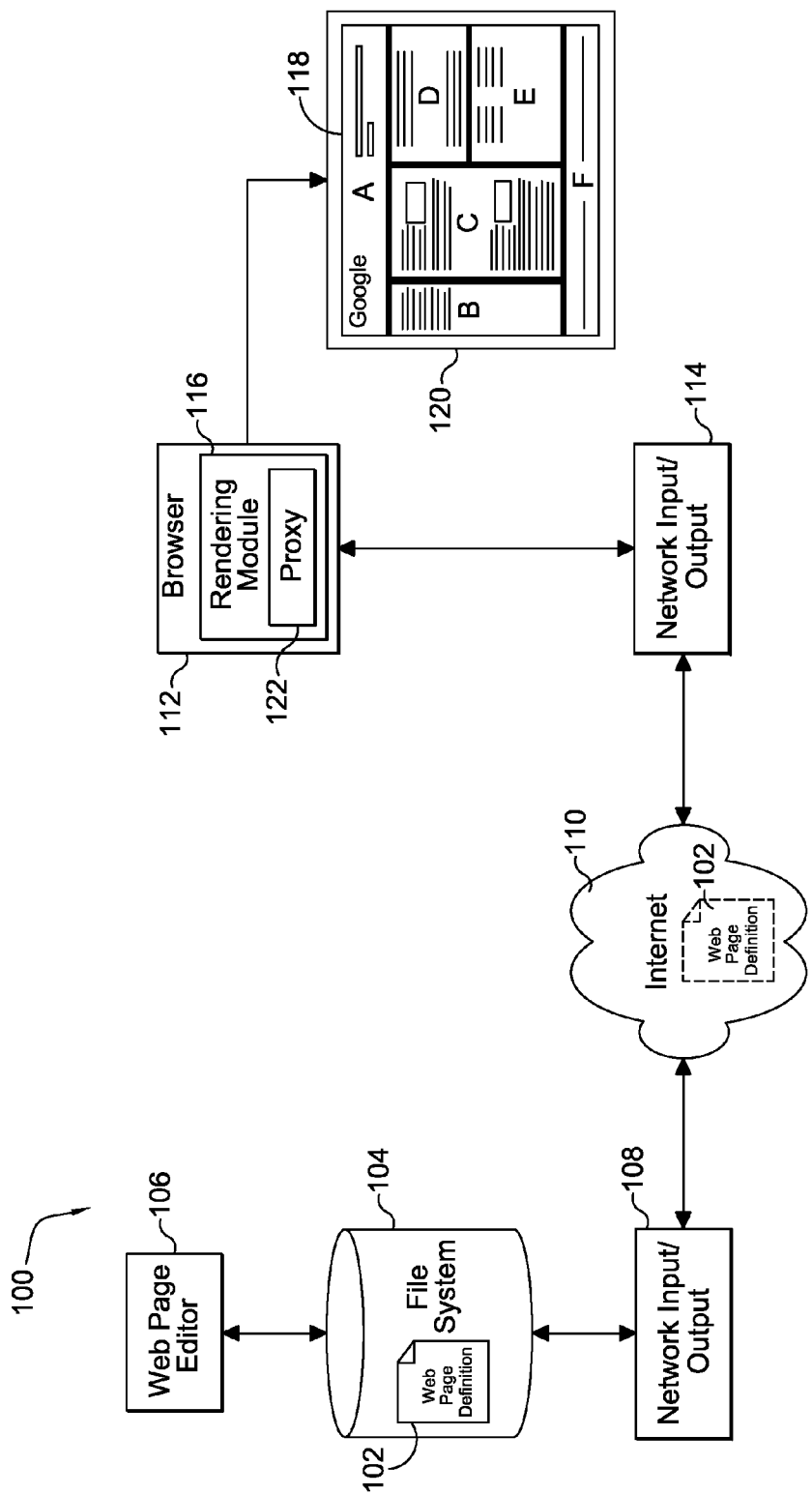
FIG. 1 illustrates an exemplary operating environment in which document representation for scalable structure may be employed.

FIG. 1 illustrates an exemplary operating environment 100 in which a document may be represented in a scalable structure. In this exemplary environment, the document is a web page definition 102. The web page definition 102 typically resides on a file system 104, from which it may be accessed by a web page editor 106. A network input/output (I/O) module 108 can access the web page definition 102 and communicate the definition 102 to a network, such as the internet 110, where the web page definition 102 is made available to browsers. Any of various other systems and devices may be included in the operating environment 100, such as firewalls, email systems, virus protection systems, etc.

A particular web browser 112 can request the web page definition 102 using an address, such as a uniform resource locator (URL), which is associated with the web page definition 102. Another network input/output (I/O) module 114 can use the Internet address to retrieve the web page definition 102 from the internet 110 and make it available to the web browser 112. A rendering module 116 reads the web page definition 102 and presents a corresponding web page 118 on a display device 120.

Presentation of the web page 118 on the display device 120 typically involves rendering the web page 118 in a viewable portion of a display screen of the display device 120. The viewable portion in which the web page 118 is rendered is referred to herein as the 'target area'. The target area is typically contained within a window, whose size and/or dimensions can be user adjustable. Thus, the target area may occupy the entire viewable area of the display screen or less than the entire viewable area of the display screen.

More specifically, the file system 104 performs typical file system function, such as saving, opening, closing, and communicating files. The network I/O modules 108 and 114 perform general communications operations to convert or format data signals so that the signals are suitable for a communications channel or a receiving device. Exemplary operations performed by the network I/O modules 108 and 114 include encoding, decoding, encrypting, decrypting, transmitting, and receiving data. The network I/O modules 108 and 114 may be embodied in any known communication device, system, and/or software, including a modulator/demodulator (MODEM), digital subscriber line (DSL), network interface cards, etc.

The internet 110 includes one or more networks over which multiple computing devices may communicate with each other. The internet 110 can include networks that are internal and/or external to an entity that uses the internet 110. For example, the internet 110 can include a company intranet. Also, the internet 110 typically includes the well-known Internet and the World Wide Web (WWW). Data traffic over the internet 110 is typically communicated using a communication protocol, such as Transmission Control Protocol/Internet Protocol (TCP/IP), File Transfer Protocol (FTP) Hypertext Transport Protocol (HTTP), Simple Object Access Protocol (SOAP), etc.

The internet 110 typically includes a number of server computers that contain internet documents, such as the web page definition 102. In one implementation of the web page definition 102, server side objects may be employed on internet 110 server computers to dynamically generate the web page definition 102.

In another implementation, the web page definition 102 is authored by a web page author using the web page editor 106. The web page editor 106 is typically a software application that a web page author can use to create and edit the web page definition 102 in one of various known authoring languages. The hypertext markup language (HTML) is one known authoring language in which the web page definition 102 can be authored.

The web page editor 106 typically provides tools to the web page author for creating the web page definition 102. Such editing tools may or may not be specific to the particular authoring language being used. In addition, the web page editor 106 may be operable to enable the author to generate a web page definition including a scalable structure for representation of the web page 118. Such a scalable structure can include block arrangement information (e.g., a slicing tree) and/or block property information, which are discussed further below.

The browser 112 and rendering module 116 are typically embodied in a client computing device. Exemplary computing devices include a desktop computer, a laptop computer, a handheld device, a server computer, and others. The display device 120 may or may not be part of the computing device. For example, typically a computer monitor is used as the display device 120 for a desktop computer. For a handheld device, such as a Personal Digital Assistant (PDA), an integrated PDA screen serves as the display device 120.

Ideally, the web page author's web page definition 102 results in a web page 118 that is optimally viewable without adaptation on all display devices, such as the display device 120. However, browsers may attempt to view the web page 118 on heterogeneous displays, which have different display device sizes or dimensions. Because of different display device characteristics, the web page 118 may be adapted and/or scaled for a particular display device. For example, for smaller display devices, such as Handheld Personal Computers (PCs), Pocket PCs, or Smartphones, one or more regions of the web page 118 may be scaled and/or adapted to fit the smaller display device or target area according to an optimization rule.

Fortunately, the web page definition 102 can be authored to include a document representation for scalable structure (DRESS) for scalable and/or adaptive representation of the web page 118 on the display device 120. DRESS can include adaptive rendering information. The adaptive rendering information describes one or more characteristics of the web page 118, such as web page 118 block properties. A rendering module 116 can use the adaptive rendering information to scale and otherwise adapt the web page 118 for a better presentation on the display device 120.

In a particular implementation, the rendering module 116 includes a proxy 122 that is operable to perform functions related to scaling and/or adapting the web page 118 to the display device 120 size and/or target area. The proxy 122 is DRESS-enabled, meaning that the proxy 122 can detect whether the web page definition 102 is in a DRESS format and, if so, the proxy 122 can transform the web page 118 to non-DRESS pages according to the display size of a target area on the display device 120.

The proxy 122 creates an adapted web page definition by re-writing the web page definition 102 based on results of a layout optimization algorithm, and deleting the DRESS information. The proxy 122 then sends the adapted web page definition to the rendering module 116 for rendering. The proxy module 122 may create web page definitions for blocks that are summarized in the adapted web page definition 102. For example, some HTML content may be replaced by a summary of the content and a link to a web page definition containing the original content.

Those skilled in the art will appreciate that adaptation of the web page definition 102 does not need to be carried out on client devices. The proxy operations of re-writing the web page definition and removing the DRESS information may be carried out on a non-client computing device. Because adapting the web page definition 102 for layout optimization may be computationally intensive, executing the proxy 122 on a powerful computer may be particularly useful if the client device is not very powerful.

Thus, in an exemplary implementation, the proxy 122 does not reside on the same client device as the browser 112, but is in communication with the browser 112. The DRESS formatted web page definition 102 may be transformed from a DRESS document to a non-DRESS formatted HTML document at either a content server or intermediary proxies, such as an enhanced firewall or a caching proxy. In such an implementation, the transformed HTML document can be shared among multiple clients to improve the efficiency. Because sharing the page among multiple clients may bring security issues, a subscription-based approach can be employed which builds a trust relationship between client and proxy.

Figure 2:
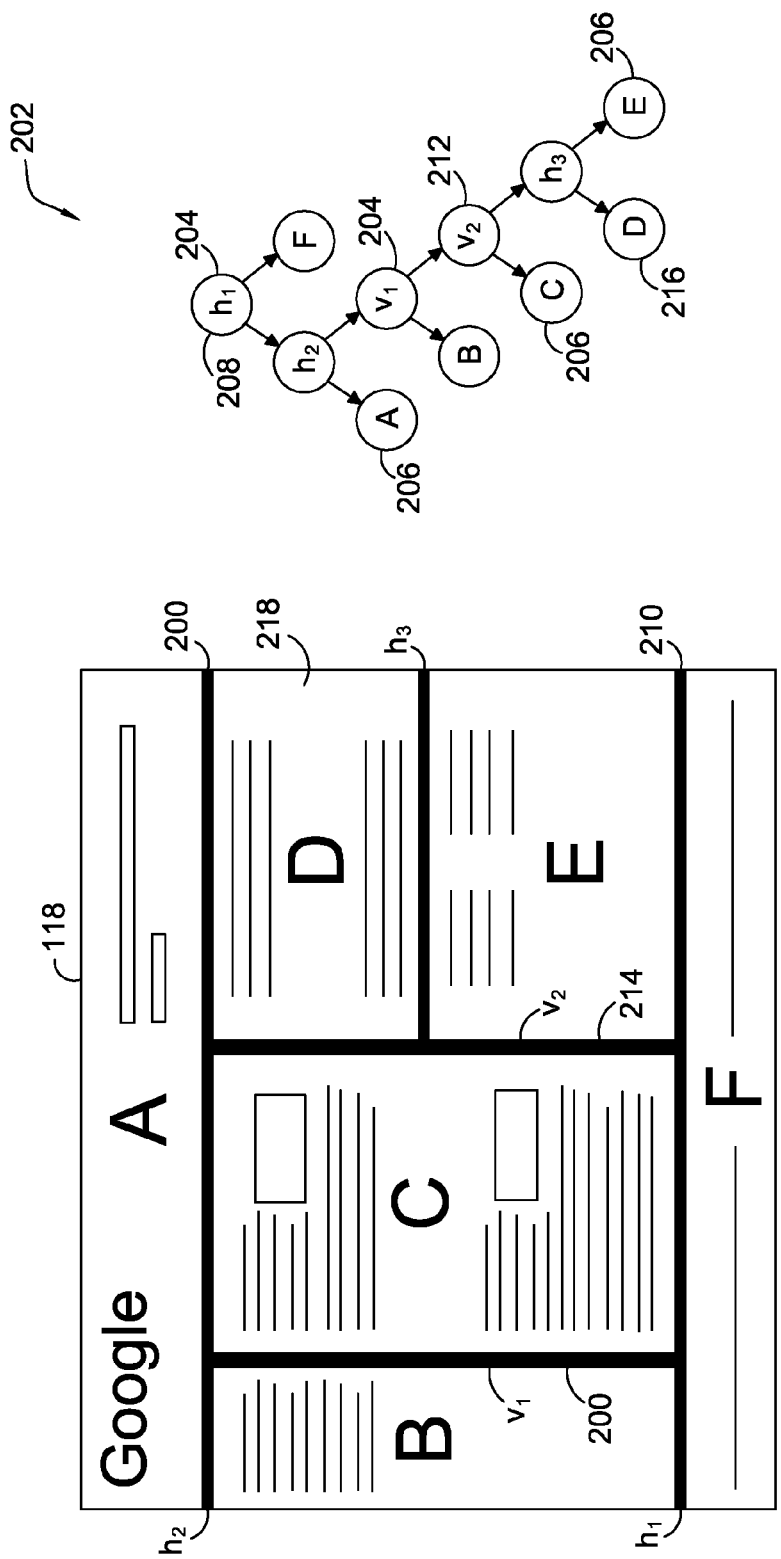
FIG. 2 is a screenshot of an exemplary web page and a slicing tree representing an arrangement of blocks in the web page.

FIG. 2 is an enlargement of the exemplary web page 118 shown in FIG. 1 and a corresponding slicing tree 202 representing an arrangement of blocks in the web page 118. The reader will recall that the web page 118 corresponds to, and is defined by, the web page definition 102, shown in FIG. 1. The exemplary web page 118 comes from Google™ news (http://news.google.com/).

As shown in FIG. 2, the web page 118 is subdivided into a number of rectangular regions, designated as blocks A, B, C, D, E, and F. Thick horizontal and vertical lines 200 are shown between adjacent blocks to emphasize the boundaries of the blocks defined by the slicing tree 202. The lines 200 are shown thick only for illustration, and during actual operation, the lines 200 typically do not appear as thick as shown. The hierarchy of the slicing tree 202 indicates how the web page 118 is recursively subdivided into sub-rectangles by slicing vertically (v) or horizontally (h).

One benefit of the slicing tree 202 is that the slicing tree 202 can reflect both the logical structure and layout structure that are intended by the author of the web page definition 102 associated with the web page 118. Authoring the web page definition 102 typically involves a top-down process of designing the web page 118. First, the author divides the web page 118 into the several blocks, designated A, B, C, D, E, and F, which are typically layout-independent (i.e., no physical overlap between blocks). For example, the web page 118 includes a header block (block A), footer block (block F), main topics block (block C), and side bar blocks (blocks B, D, and E).

After subdividing the area of the web page 118 into the desired blocks, the author populates each block with desired contents (e.g., text, links, images, graphics, etc.). The author may also insert decorations or separators into each block, which may further divide the block into sub-blocks. Thus, each block can be used as a basic unit to deliver information and/or attract user attention.

The slicing tree 202 may be useful in subdividing the web page 118 into desired blocks and sub-blocks. The slicing tree 202 includes a number of inner nodes 204 and a number of leaf nodes 206. The label on each inner node 204 indicates a orientation, either vertical or horizontal, of a subdividing line in the displayable area of the web page 118. For example, inner node 208, labeled $h_1$, represents horizontal line 210, and inner node 212, labeled $v_2$, represents vertical line 214, and so on.

In the particular slicing tree 202 shown, a right branch off a node labeled with an 'h' represents an area in the web page 118 below the corresponding horizontal line; a left branch off a node labeled with an 'h' represents an area in the web page 118 above the corresponding horizontal line; a right branch off a node labeled with a 'v' represents an area in the web page 118 to the right of the corresponding vertical line; a left branch off a node labeled with a 'v' represents an area in the web page 118 to the left of the corresponding vertical line.

Each leaf node is labeled with one of the blocks (i.e., either A, B, C, D, E, or F). Thus, each leaf node represents a corresponding block in the web page 118. For example, leaf node 216, labeled 'D', represents the block D 218 in the web page 118.

In the particular implementation illustrated in FIG. 2, the slicing tree 202 indicates whether a subdividing line between two areas of the web page 118 is horizontal or vertical, but the slicing tree 202 does not indicate where the subdividing line is located in the web page 118. Thus, in this implementation the slicing tree 202 does not provide the sizes of the blocks relative to each other or relative to the display size or target area. To determine where the horizontal and vertical subdividing lines are located, a slicing number is used.

A slicing number represents a proportion of block size to display size or target area. Because blocks in the web page 118 are scalable to fit a particular display size or target area, the slicing number depends on how each of the blocks is scaled, if at all. As discussed below in further detail, whether a block is scaled and to what extent a block is scaled is determined by block property data. Thus, the slicing numbers can be adjusted adaptively to the display size or target area. Slicing numbers and block property data are discussed in further detail below.

It should be recognized that the slicing tree 202 as shown in FIG. 2 is an abstraction that is useful for illustrating how the web page 118 may be subdivided. An actual implementation of the slicing tree 202 may be embodied in software, hardware, firmware, or any combination thereof.

For example, an authoring language, such as Hypertext Markup Language (HTML), is used to define the slicing tree 202. In this implementation, DRESS information is stored as comments within HTML files or style sheets. For example, the slicing tree 202 structure of the web page 118 can be represented with a Polish expression "((A–(B|(C|(D–E))))–F)", where "–" and "|" denote horizontal and vertical slicing, respectively. The following HTML pseudo code illustrates one implementation of the slicing tree 202 in a DRESS format.

EXAMPLE CODE (1):

```
<!--DRESS SlicingTree=((A - ( B | ( C | ( D - E ) ) ) ) - F)-->
<!--Block ID="A" IMP="0.15" MPS="35000" MPH="80" MPW="400" ADJ="No" ALT= "Google News Search"-->
contents of block A ...
...
<!--Block ID="B" IMP="0.1" MPS="14000" MPH="140" MPW="100" ADJ="No" ALT= "Left Sidebar"-->
contents of block B ...
...
<!--Block ID="C" IMP="0.4" MPS="80000" MPH="150" MPW="200" ADJ="Yes" ALT= "Top Stories"-->
contents of block C ...
...
<!--Block ID="D" IMP="0.2" MPS="30000" MPH="100" MPW="150" ADJ="Yes" ALT= "Hot News List"-->
contents of block D ...
...
<!--Block ID="E" IMP="0.1" MPS="20000" MPH="100" MPW="200" ADJ="No" ALT= "In the news"-->
contents of block E ...
...
<!--Block ID="F" IMP="0.05" MPS="9000" MPH="40" MPW="150" ADJ="Yes" ALT= "Google Footer"-->
contents of block F ...
...
<!-- DRESS End -->
```

In another implementation of the slicing tree 202, the DRESS information is stored in an external markup language (XML) document that can use XPath and XPointer to indicate the information blocks in the original HTML file.

In another implementation, the slicing tree 202 need not be written by the author in advance. In this implementation, the slicing tree 202 may be obtained automatically by any known layout detection approaches, such as an object projection algorithm. Typically, a layout detection and projection algorithm analyzes the web page structure from the web page definition to determine a corresponding slicing tree. Such an algorithm may also create block property data (discussed further below) to facilitate web page adaptation.

In an exemplary implementation of the browser 112, the user is able to designate the desired target area. When browsing the web page 118, DRESS information in the web page definition 102 is parsed, and a main result HTML file is generated that fits the target area. Any adapted (e.g., summarized) block contents can be saved in one or more intermediary HTML files that are accessible by following the links of alternatives (discussed further below). Such intermediary HTML data can be saved in memory, such as random access memory (RAM), instead of files if the adaptation is performed at client side.

As shown in the example code (1) above, DRESS information can include block property data associated with one or more of the blocks. Block property data specifies parameters, attributes, and/or preferences desired by the author, which should be preserved during rendering of blocks in the web page 118, even though the blocks and their content may be scaled and/or adapted for a particular display size. Thus, block property data serves as a mechanism to communicate the web page definition 102 author's intent, while allowing for some variation in how the web page 118 may be rendered. Exemplary block property data is shown in Example Code (1) above.

Referring again to the web page definition 102 in FIG. 1, a particular implementation of the web page definition 102 includes the following block property data for the 'ith' block, designated as information block $B_i$: importance value ($IMP_i$), minimal perceptible size ($MPS_i$), minimal perceptible height ($MPH_i$), minimal perceptible width ($MPW_i$), adjustability ($ADJ_i$), and alternative ($ALT_i$).

Thus, the 'ith' block can be characterized using the following expression:

$$B_i=(IMP_i, MPS_i, MPH_i, MPW_i, ADJ_i, ALT_i), \quad \text{Equation (1)}$$

where i=1, 2, ..., N,
$B_i$, the $i^{th}$ information block in the Web page
$IMP_i$, importance value of $B_i$
$MPS_i$, minimal perceptible size of $B_i$
$MPH_i$, minimal perceptible height of $B_i$
$MPW_i$, minimal perceptible width of $B_i$
$ADJ_i$, whether the aspect ratio of $B_i$ is adjustable
$ALT_i$, alternative of $B_i$ The importance ($IMP_i$) parameter represents relative importance of information block $B_i$. Because different blocks can carry different amounts of information and have different functions, the blocks can be of different importance. The $IMP_i$ parameter can be a quantified value of the webpage author's subjective evaluation of an information block. As such, the $IMP_i$ parameter is an indicator of the value of the contents of block $B_i$ relative to contents of other blocks.

In a particular implementation of DRESS, the $IMP_i$ parameter represents a weight of the content of block $B_i$'s contribution to the information of the whole web page. In this implementation, the values (or weights) of all $IMP_i$ parameters for a single webpage are normalized such that their sum is equal to one (1). When the web page is rendered, the $IMP_i$ parameter can be used to choose less important blocks for summarization, or other adaptation, for the target area.

Although the $IMP_i$ parameter can be advantageously used by an author of a web page definition to discriminate different block contents, a particular implementation of a browser enables a user to input a block preference, which affects importance values. For example, an importance value may be adjusted to a user's current focus, such as the position of a mouse or other input device. Thus, the importance of various web page blocks can be personalized. In addition, automatic approaches can be employed for automatically or dynamically adjusting the importance parameter based on one or more block characteristics, such as block function, position, and size. For instance, a footer block can be automatically assigned less importance than a news headlines block in a web page.

The minimal perceptible size ($MPS_i$), minimal perceptible height ($MPH_i$), and the minimal perceptible width ($MPW_i$) attributes can be used for layout optimization. As to document rendering, many techniques can be applied to accommodate diverse target area sizes, such as zooming, scaling, wrapping, font size reduction, or margin cropping. Of course, the information delivery ability of a block may be highly dependent upon the size of a block's area of presentation. If an information block is scaled down too much, contents of the block may not be perceptible enough for users to adequately recognize or understand the information that the web page definition author intended to deliver.

Therefore, the minimal perceptible size ($MPS_i$), minimal perceptible height ($MPH_i$), and minimal perceptible width ($MPW_i$), to denote the minimal allowable spatial area, height, and width of an information block, $B_i$, respectively. $MPS_i$, $MPH_i$, and $MPW_i$, can be used by a browser, rendering module, and/or proxy module as thresholds to determine whether the associated information block should be reduced in size or summarized when rendering the block.

The values of $MPS_i$, $MPH_i$, and $MPW_i$ can be given in pixels, font size, or any other relevant target area size units. For instance, consider an information block, $B_i$, of a short news story whose original region size is 30,000 pixels. The author or publisher may define the block's associated $MPS_i$ to be an area of half-scaled (scaled by half in both the vertical and horizontal dimensions), i.e., 7,500 pixels, which is assumed to be the smallest resolution to keep the text still readable. The author can also set the $MPH_i$ equal to the height of a 9-point character so that the text can be displayed correctly.

The $MPS_i$, $MPH_i$ and $MPW_i$ values can depend upon the usage context, such as the user's eyesight and his distance from the screen. For example, if a web page is shown on a television (TV) set with set-top box installed, the $MPS_i$, $MPH_i$ and $MPW_i$ values are preferably tuned bigger, since users usually operate the TV set from a distance via a remote control. $MPS_i$ can also be an indicator of the amount of content in an information block.

In a particular implementation, $MPS_i$, $MPH_i$ and $MPW_i$ values can be automatically calculated according to the total number of characters, height of one character, and the longest word within a text paragraph, respectively. Various layout algorithms discussed below illustrate further how the $MPS_i$, $MPH_i$ and $MPW_i$ values can be beneficially used to adapt and/or scale blocks in a web page while abiding by the intent of the web page author.

The Adjustability ($ADJ_i$) parameter denotes whether the aspect ratio of information block, $B_i$, is adjustable. For example, the content block, $B_i$, may include flexible contents, such as pure text or a mixture of images and text (e.g., a news paragraph), which can be positioned, wrapped or otherwise adjusted within a display region, without detracting from what the author intended with the content and/or the content's informative value. In such a situation, the author may set the $ADJ_i$ parameter to true, indicating that the aspect ratio of the display region may be adjusted for block $B_i$.

However, if the information block, $B_i$, includes inflexible contents, such as a table, navigation bar, or a large image, the aspect ratio is preferably fixed because adjusting the aspect ratio may detract from the author's intent and/or reduce the informative value of the contents. In this situation, the value of $ADJ_i$ is set to false, and when the block $B_i$ is rendered, the aspect ratio is fixed at the block's associated Minimum Perceptible Width ($MPW_i$) and Minimum Perceptible Height ($MPH_i$).

The $ADJ_i$ attribute is used in the content accommodation algorithm described below. If not specified, $ADJ_i$ can be determined by analyzing HTML tags. Alternatively, if $ADJ_i$ is not specified, an implementation of the rendering module can assume a default value.

The $ALT_i$ parameter indicates whether block $B_i$ is to be alternatively rendered. Alternative rendering of a block in general refers to presenting an adapted or alternative version of the block's contents or information. Implementations of adapting described herein focus on content summarization; however, adapting may involve other types of content adjustment techniques in other implementations. For client devices that utilize display devices with non-traditional sizes and/or dimensions, using an alternative version may be beneficial for preserving the original intent of a web page author. In one implementation, an alternative is a content reference, such as a short text string or small icon, which represents the original contents of the block. For example, a short text string briefly describes the original block contents, but does not occupy as much area on the display screen. As such, the content reference preferably is relatively small in size due to the reference's functional requirements. The function of the content reference is similar to the ALT attribute of an IMG tag in HTML. The content reference can be obtained by manual input from the author or an information extraction algorithm.

In another implementation of block property data, an alternative version of a block is a summarized version of the block's contents, which is user selectable (e.g., hypertext). When the user selects the summarized version, a new web page, which is the size of the target area, is rendered that includes the non-summarized, or original version of the block contents. Thus, the original version of the block is allocated the entire target area, rather than being squeezed into what may be a relatively small region of the target area. Instead of deleting contents or showing an imperceptible adapted version, an alternative version enables users to see the whole in parts and can provide a much better solution to preserve contents, save display space, and aid user navigation. If necessary (i.e., for very large content blocks), a scroll bar may be added to the original block.

In another implementation of the $ALT_i$ parameter, when the use selects summarization text for the block, a technique similar to the fisheye view is employed to highlight the corresponding block.

Alternatives may be advantageously employed under a number of scenarios. For example, with regard to information blocks of relatively less importance, such as decorations or advertisements, it may be desirable to summarize such less important blocks in order to save display space for relatively more important blocks. As another example, when dealing with a block of large MPS which cannot be displayed without excessive shrinking due to the limited display size, a summary with a link to the original contents is more preferable.

Based on the previously described DRESS, the problem of electronic document (e.g., web page) layout adaptation can be better handled to accommodate both author intention and user context. In the following description, a concept of information fidelity is presented with exemplary algorithms for determining an optimal electronic document layout under various constraints.

Presentation of a Web Page

Presentation of a web page involves rendering the web page in a viewable portion of a display screen based on the definition of the web page. Information blocks within the web page may be adapted and/or scaled during rendering as a function of block property data, target area size or dimensions, or other factors. In addition, the determination as to whether a block should be adapted (e.g., summarized), and the extent to which a block is adapted can be facilitated by analysis of a parameter, referred to as 'information fidelity' (IF).

Generally, IF represents a level of difference between a modified (e.g., adapted, scaled, etc.) version of a content object and the original version of the content object. With respect to a web page, IF can represent a level of difference between adapted versions of one or more web page blocks and the original versions of the one or more web page blocks. IF can also represent the level of difference between an adapted version of an entire web page and the original web page.

Information fidelity (IF) can provide for quantitative evaluation of content representation. In an exemplary implementation, the value of IF ranges from zero (0) to one (1). In this implementation, an IF value of zero (0) indicates that all information has been lost due to adaptation and/or scaling of one or more web page blocks, whereas an IF value of one (1) indicates that all information has been preserved.

A total IF of a web page can be determined based on the IF of the individual blocks in a web page. The IF of a single block can be a function of various parameters, such as spatial region of display, content reduction of text, color depth or compression ratio of images, etc.

In one particular implementation, the IF of a single block only depends on the version of the content block, i.e., whether it is summarized or not. In this implementation, if a content block is replaced by its alternative (i.e., a summarized version), the IF value of the content block is defined to be 0; otherwise the IF of the content block is 1. This implementation is discussed in detail here for simplicity of illustration.

To illustrate, if an exemplary web page P contains N blocks, the resulting total IF for web page P can be defined as a weighted sum of the IF of all N blocks in the web page P. One implementation involves employing the importance (i.e., IMP, discussed above) values from DRESS as the weights of contributions of each of the N blocks to the perceptual quality of the whole web page P. Thus, the total IF of the web page P, whose blocks may or may not be adapted, is expressed in the following equation (2):

$$IF(P) = \sum_{B_i \in P} IMP_i \cdot IF_{B_i}, \quad \text{Equation (2)}$$

where $IMP_i$ represents the importance of block $B_i$ as discussed above, $IF_{B_i}$ represents the information fidelity of block $B_i$, IF(P) represents the total IF of web page P, and i ranges from 1 to N, for all N blocks in web page P.

Equation (2) can be used as an object function of an adaptation algorithm. To illustrate, as more blocks are summarized to fit in a target area, the IF of those blocks decreases, and hence, the IF(P) decreases. An optimal solution is to maximize the IF(P) which is delivered by a browser, subject to a layout constraint that ensures the blocks will fit in the target area and the blocks are adequately perceptible.

The layout constraint and optimization rule are developed as follows. Assume that P' represents the set of unsummarized (i.e., not adapted) information blocks in a web page P, $P' \subset P = \{B_1, B_2, \ldots B_N\}$. One approach involves determining the block set P' to optimize a function of total information fidelity (IF), target area size, and perceptibility parameters. Thus, a subset of all blocks in web page P is selected such that IF(P) is maximized, subject to the layout constraint.

The layout constraint involves solving a function of block sizes and the target area size. The total area of the N content blocks in web page P is the sum of the area of the unsummarized content blocks in set P' plus the sum of the area of the summarized content blocks (i.e., those blocks not in the set P'). If a block, $B_i$, is summarized, the block's size is given by the expression 'size($ALT_i$)'. If a block, $B_i$, is not summarized, it is assumed that the size of the unsummarized block is $MPS_i$.

Thus, satisfying the mathematical constraint given by equation (3) ensures that all the content blocks, both summarized and unsummarized, will fit in the target area.

$$\sum_{B_i \notin P'} size(ALT_i) + \sum_{B_i \in P'} MPS_i \leq Area, \quad \text{Equation (3)}$$

where Area is the size of target area and size($ALT_i$) is a function which returns the size of display area required by the summarized block $ALT_i$. For clarity, equation (3) can be transformed into the following expression:

$$\sum_{B_i \in P'} (MPS_i - size(ALT_i)) \leq Area - \sum_{B_i \in P} size(ALT_i) \quad \text{Equation (4)}$$

The constraint given by equation (4) implies that the target area should not be too small, otherwise a valid layout may not be attainable, even when all the blocks have been summarized; however, such a scenario will in practice be very rare. In such a rare case, sub-tree summarization may be employed.

Thus, an exemplary layout optimization rule is expressed as shown in equation (5):

$$\max\left(\sum_{B_i \in P} IMP_i \cdot IF_{B_i}\right) = \quad \text{Equation (5)}$$

$$\max_{P'}\left(\sum_{B_i \in P'} IMP_i\right) \text{ subject to } \sum_{B_i \in P'} (MPS_i - size(ALT_i)) \leq$$

$$Area - \sum_{B_i \in P} size(ALT_i)$$

Those skilled in the art will recognize equation (5) to be a nondeterministic polynomial time-complete (NP-complete) problem (e.g., 0-1 knapsack).

Since the constraint of equation (3) does not ensure that the MPH or MPW will be satisfied, the problem can be solved by a two-level approach. First a branch and bound algorithm can be used to enumerate all possible sets P'; for each possible block set, a capacity ratio based slicing algorithm can be used to test whether a valid layout can be found. Using such a process, all possible unsummarized block sets P' are searched, and an optimal block set, $P'_{Opt}$, is selected according to the optimization rule given in equation (5). Such a two-level approach is described below.

Figure 3:
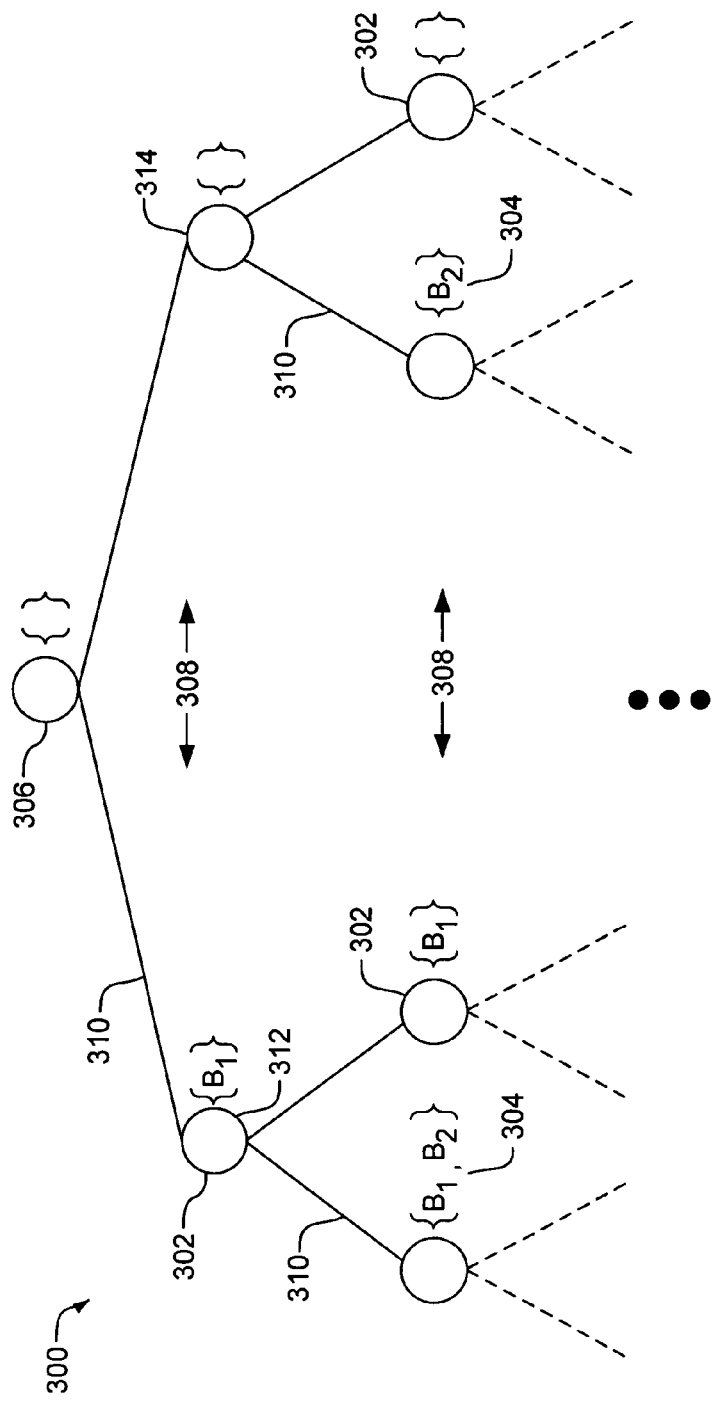
FIG. 3 is a binary tree that may be used in conjunction with a block layout optimization algorithm.

FIG. 3 is an exemplary binary tree 300 that may be used by a rendering module in conjunction with a block presentation optimization algorithm to determine combination of unsummarized blocks and summarized blocks in a web page P, having N total blocks, such that equation (5) is satisfied. Since equation (5) is NP-complete, it may be impractical to perform an exhaustive search for the best solution. An exemplary implementation, therefore, includes a branch-and-bound algorithm using a binary tree, such as the binary tree 300, to select the block set $P'_{Opt}$ efficiently.

As shown in FIG. 3, the binary tree 300 includes multiple nodes 302, each node representing some combination, P', of unsummarized blocks 304. Any blocks not included at a node 302 are assumed to be summarized. Thus, each node 302 necessarily represents a combination of unsummarized and summarized blocks. The root node 306 is a null set Φ implying all the blocks in web page P are summarized at the root node 302.

Each level 308 of the binary tree 300 includes another unsummarized information block in addition to the unsummarized information blocks included in the level 308 directly above it. As such, a branch 310 to a lower level 308 represents a choice of keeping the original contents or generating a summary of the additionally included block in the next lower level 308.

Thus, the height of the binary tree 300 is N levels 308, the total number of blocks contained in the web page P, and each leaf node in the binary tree 300 corresponds to a different possible set P' of unsummarized blocks. Nodes 302 that are at the same level 308 are referred to as sibling nodes. Thus, for example, node 312 is considered a sibling node of node 314. Nodes at lower levels are considered children, grandchildren, and so on, of nodes at higher levels. Thus, for example, node 312 and node 314 are child nodes of node 306.

A particular implementation of a layout optimization algorithm includes a depth-first traversal of the binary tree 300, in which it is determined whether the set of unsummarized blocks P' associated with each node 302 provides the optimal information fidelity within the required layout constraint. An exemplary algorithm considers each child node of a parent node before considering sibling nodes. At each node 302, operations are performed to determine whether the node 302 and/or an entire branch under the node 302 should be eliminated from consideration.

For each node 302 in the binary tree 300, an upper boundary exists on the possible IF value that the node 302 can achieve among all of the node's 302 associated sub-trees. This upper boundary is the sum of all IF values of those unchecked (i.e., not considered yet) blocks below the current level; in other words, the upper boundary of the IF is the sum of IF values of all blocks in the web page, except the blocks that have been summarized before the current level. Of course, the lower boundary of the IF value at any given node 302 is equal to a best IF value currently achieved during the traversal. An exemplary traversal algorithm is illustrated in FIG. 4, and is discussed in relation to the binary tree 300.

Figure 4:
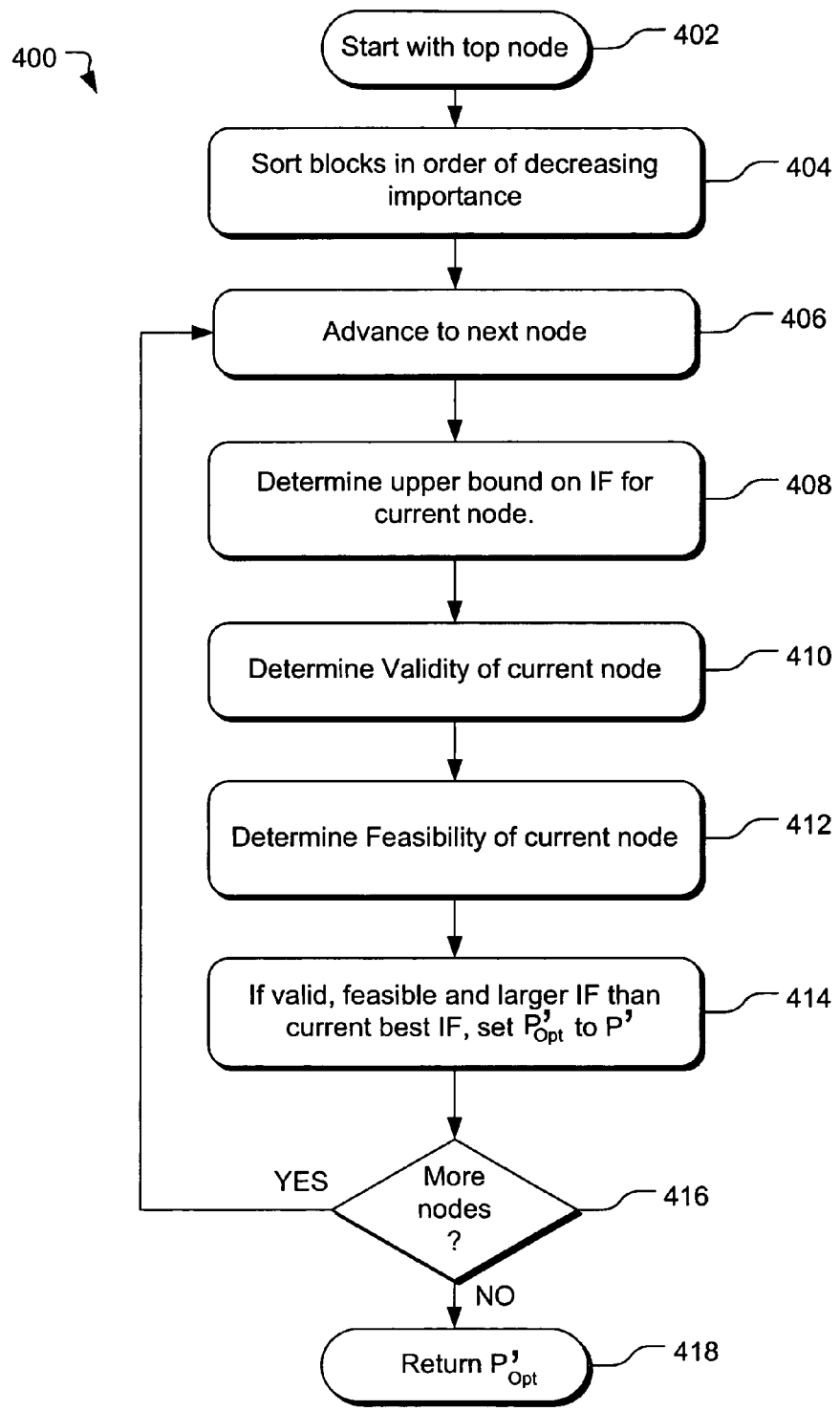
FIG. 4 is a flow chart including exemplary operations for determining a combination of web page blocks for adapting based on target area size and block property data.

FIG. 4 illustrates a depth-first traversal operation 400 to search for an optimal set of unsummarized blocks P'$_{Opt}$ in accordance with the optimization rule expressed in equation (5). It is assumed that a web page definition having a slicing tree and block property data for a plurality of information blocks has been received prior to executing the algorithm 400. The algorithm 400 can be executed by a proxy module (e.g., proxy module 122, FIG. 1) to determined which blocks of a web page will be summarized by a rendering module (e.g., rendering module 116, FIG. 1). Other blocks that are not in the set P'$_{Opt}$ will be summarized. The algorithm 400 is described with reference to FIGS. 3 and 5.

A starting operation 402 starts with the top node 306 in the binary tree 300. A set P'$_{Opt}$ is set equal to the null set in the starting operation. The current node is set to the top node 306 and a current best IF value is set equal to the IF of the current node 306. In the case of top node 306, the IF is zero (0) because all the blocks are summarized at the top node 306. In this implementation, a summarized block is assigned an IF of zero (0) and an unsummarized block is assigned an IF of 1. The IF associated with multiple blocks is equal to the sum of the blocks' individual IF values.

A sorting operation 404 sorts a list of the blocks in order of decreasing importance based on the importance values, IMP$_i$. Such sorting can improve the speed and efficiency of the search because in many cases only a few blocks contribute the majority of the total IF value.

An advancing operation 406 sets the current node to the next node in the binary tree 300 in accordance with a depth-first traversal. Thus, during the first iteration, the advancing operation 406 advances from the top node 306 to its child node 312. The set P' associated with the next node is analyzed as to validity, feasibility, and information fidelity in the following operations.

A determining operation 408 determines the upper bound on IF for the current node. IF the determined upper bound on IF is less than the current best IF, the current node and the node's sub-tree are truncated (i.e., removed from consideration during the search).

A second determining operation 410 determines whether the combination of unsummarized blocks (and summarized blocks) associated with the current node is valid. Validity refers to whether the combination of blocks associated with the current node will fit in the target area. One implementation of the determining operation 410 applies equation (3) above using size information (e.g., MPS, ALT, etc.) in the block property data. If the block combination of the current node will not fit in the target area, then there is no need to traverse the branches below the current node, because each level below the current node adds an unsummarized block that increases the total block size. Thus, the determining operation 410 truncates the current node and the current node's sub-tree if the equation (3) is not satisfied.

Another determining operation 412 is executed if the current node has a larger IF than the current best IF. Determining operation 412 determines the feasibility of the block combination associated with the current node. Feasibility refers to whether the current block can be accommodated in the target area in a way that satisfies the block property data parameters (e.g., MPS$_i$, MPH$_i$, MPW$_i$, etc.). The determining operation 412 can be implemented using a capacity (size) ratio based slicing algorithm shown below in example codes (2), (3), and (4).

When checking the feasibility of a block set P', the determining operation 412 attempts to find an aesthetic layout to put all unsummarized and summarized blocks in the target area. In one implementation, the slicing tree structure remains constant during the adaptation process. In this implementation, slicing numbers are calculated. The capacity ratio based slicing algorithm involves two general steps that can be implemented in example codes (2), (3), and (4) below. These example codes are discussed in conjunction with FIG. 5.

Figure 5:
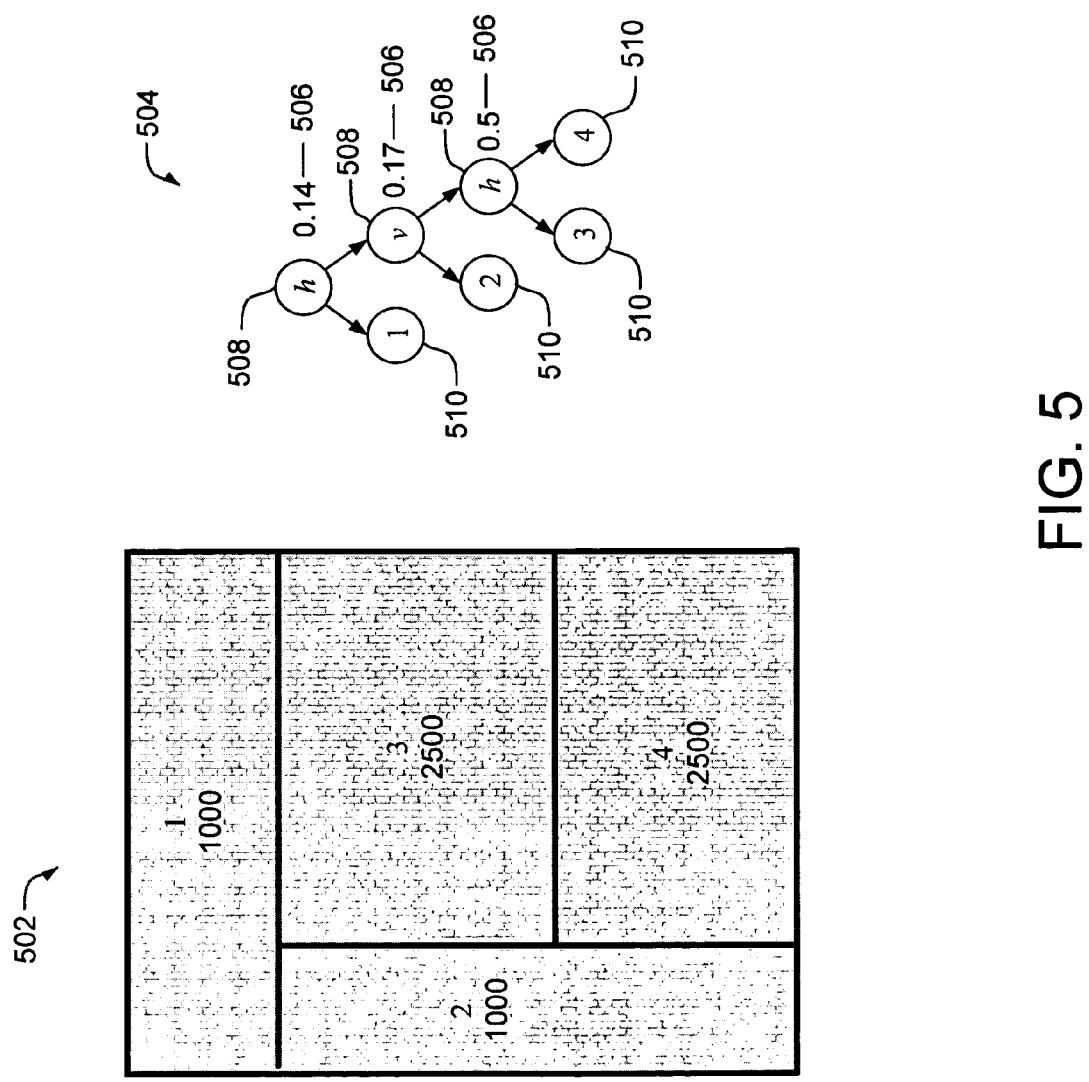
FIG. 5 depicts a web page divided into a plurality of blocks, in which each block has associated minimum perceptible size that may be used to derive a scaling factor.

FIG. 5 illustrates and exemplary web page 502 with an associated exemplary slicing tree 504 to which the capacity ratio based algorithm has been applied to determine a slicing number 506 for each inner node 508. First, the slicing tree 504 is traversed bottom-up to calculate the capacity (size), height and width constraints for each slicing tree inner node 508 using the combination of summarized and unsummarized blocks associated with the current binary tree node.

EXAMPLE CODE (2)

```
Slicing ( )
{
    // calculate capacity, height and width constraints
    Aggregate (root);
    // calculate slicing numbers
    root->area = TARGET_AREA; // target display size
    root->height = TARGET_HEIGHT; // target display height
    root->width = TARGET_WIDTH; // target display width
    if (Allocate (root) == true) return true;
    else return false;
}
```

EXAMPLE CODE (3)

```
Aggregate (p)
{
    if p is a leaf node
        if p is a summarized block
            p->capacity = size (p->alternative);
            p->minheight = height (p->alternative);
            p->minwidth = width (p->alternative);
        else // p is unsummarized
            p->capacity = p->MPS;
            p->minheight = p->MPH;
            p->minwidth = p->MPW;
    else // p is an inner node
        Aggregate (p->lchild);
        Aggregate ( p->rchild);
        p->capacity = p->lchild->capacity + p->rchild->capacity;
        if p->label == vertical
            p-> minheight = max(p->lchild->minheiht, p->rchild->minheight );
            p-> minwidth = p->lchild->minwidth + p->rchild->minwidth;
        else // p's label is horizontal
            p-> minheight = p->lchild->minheight + p->rchild->minheight;
            p-> minwidth = max (p->lchild->minwidth, p->rchild->minwidth);
}
```

The detailed flow of first step is shown in example codes (2) and (3), which calculate the capacity, height and width constraints associated with each inner node 506 each slicing tree 504. The capacities of each sub-tree in the slicing tree 504 are aggregated. The minimal height and minimal width of each slicing tree 504 node represent size constraints for each inner node 506 (i.e., the sum of the area occupied by the blocks associated with the inner node 506). For a text-summarized block, the minimal height and minimal width correspond to the values of the summarized block's alternative (i.e., $ALT_i$), which can be calculated automatically from the summary text.

EXAMPLE CODE (4)

```
Allocate (p)
{
    if p->area < p->capacity or p->height < p->minheight or p->width < p->minwidth return false;
    if p is an inner node
        p->slicingnumber = p->lchild->capacity / p->capacity;
        if p->label == vertical
            p->lchild->height = p->height
            p->rchild->height = p->height;
            p->lchild->width = p->slicingnumber * p->width;
            p->rchild->width = p->width - p->lchild->width;
            if p->lchild->width < p->lchild->minwidth
                p->lchild->width = p->lchild->minwidth;
                p->rchild->width = p->width - p->lchild->minwidth;
            else if p->rchild->width < p->rchild->minwidth
                p->rchild->width = p->rchild->minwidth;
                p->lchild->width = p->width - p->rchild->minwidth;
        else // p's label is horizontal
            p->lchild->width = p->width
            p->rchild->width = p->width;
            p->lchild->height = p->slicingnumber * p->height;
            p->rchild->height = p->height- p->lchild->height;
            if p->lchild->height < p->lchild->minheight
                p->lchild->height = p->lchild->minheight;
                p->rchild->height = p->width - p->lchild->minheight;
            else if p->rchild->height < p->rchild->minheight
                p->rchild->height = p->rchild->minheight;
                p->lchild->height = p->height- p->rchild->minheight;
        if (Allocate (p->lchild ) == false) return false;
        else if (Allocate (p->rchild ) == false) return false;
        else return true;
            else return true // do nothing when p is a leaf node
}
```

In a second operation of the capacity ratio based slicing algorithm, the slicing numbers 506 are computed over the slicing tree 504 top-down. The example code (4) compares the capacities (sizes) of two slicing tree sub-trees of each inner node 508 and determines the slicing number 506 based on the ratio of each sub-tree size to the total area occupied by the blocks associated with the sub-trees. As shown in FIG. 5, the MPS values of the four content blocks 1, 2, 3, and 4, in web page 502 are 1000, 1000, 2500 and 2500, respectively. If all of the blocks are not summarized in the adaptation, the slicing number of the slicing tree root node (top most slicing tree node) will be: 1000/(1000+1000+2500+2500)=0.14.

As an example, if the target area of the web page 502 is 600 in height, the total area is split horizontally at the height of 600*0.14=84. However, if block 1 has set its $MPH_1$ to 100, then the total area will be split at the height of 100 in order to meet this requirement. Other adjustments can be made to the slicing numbers to meet display constraints or parameters in the block property data. FIG. presents the algorithm details. This procedure is executed recursively until all the slicing numbers are decided for the inner nodes 508.

Referring again to the algorithm 400 in FIG. 4, if it is determined that the current node includes a valid, feasible set of unsummarized blocks, which have a higher IF than the current best IF, a setting operation 414 sets $P'_{Opt}$ equal to P' corresponding to the current node. The setting operation also sets the current best IF equal to the IF of the current node.

A query operation 416 determines whether more nodes are to be analyzed in the binary tree 300. If more nodes are to be analyzed, the algorithm 400 branches 'YES' to the advancing operation, where the next node is selected in the depth-first traversal. If no more nodes remain to be checked, the algorithm 400 branches 'NO' to a return operation 418. The return operation 418 returns the optimal set of unsummarized blocks, $P'_{Opt}$.

After layout optimization, each block, whether summarized or not, has been assigned a rectangle region for display. According to the capacity ratio based slicing algorithm, the area size of the assigned region for each slicing tree node will be larger than the node's MPS value. The height and width of the display region will also meet the requirements of each block. The ADJ attribute of each information block can be used to aid a content adaptation process. If a block is indicated to be adjustable, various processes can be used to fit the block into the block's assigned rectangle, such as zooming and/or wrapping the block's contents. Other content adaptation techniques like attention model based image adaptation can also be integrated into this step.

Figure 6:
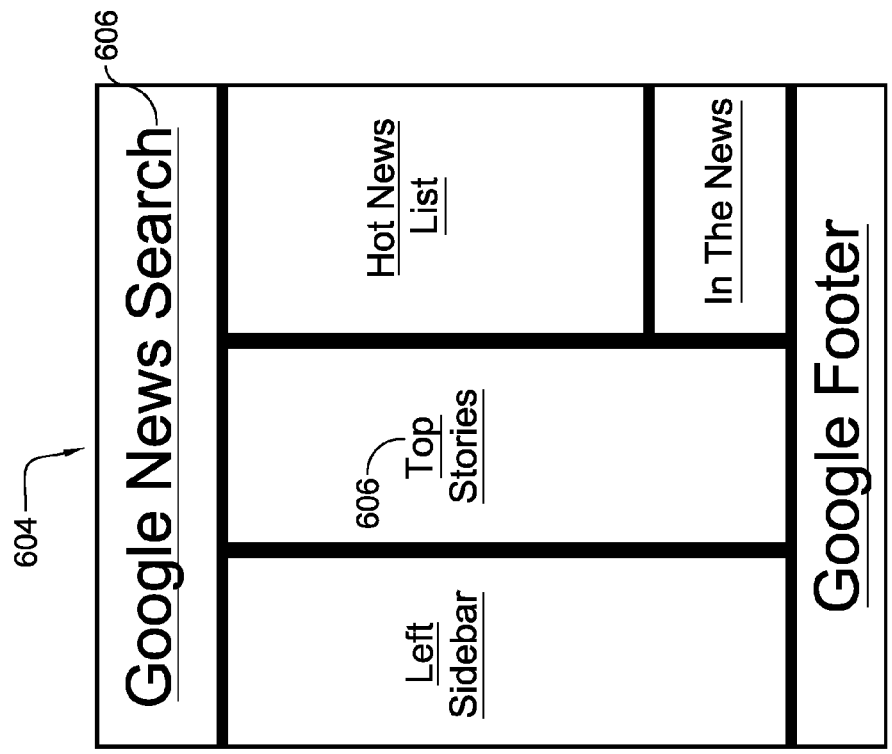
FIG. 6 illustrates two exemplary screenshots of a web page that has been represented in a scalable structure for layout adaptation.
Figure 6:
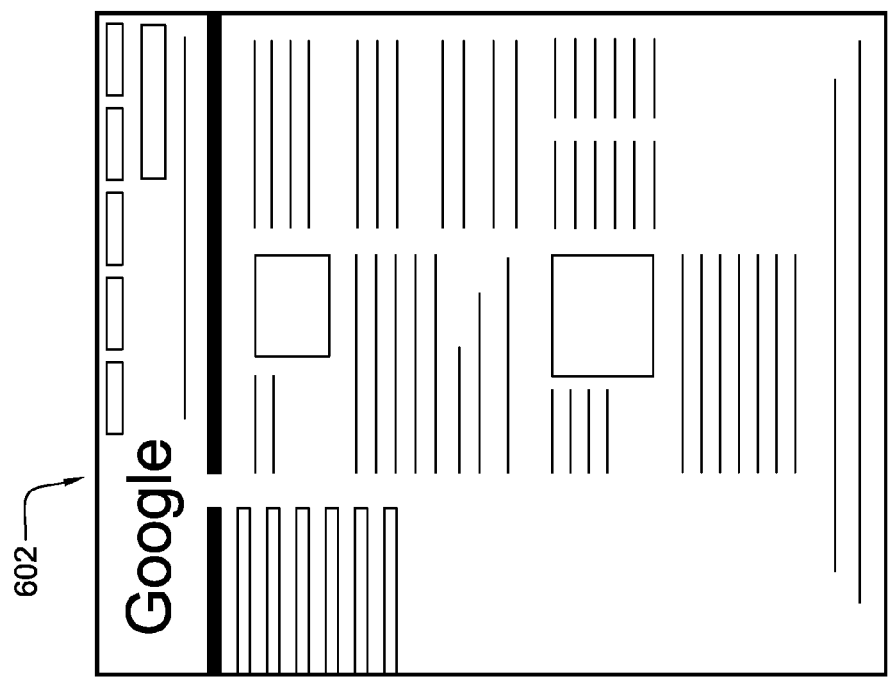

FIG. 6 illustrates two exemplary screenshots of a web page that that could result from implementations described. A first screenshot 602 is an original version of web page based on a web page definition. A second screenshot 604 is a second web page based on the same web page definition, but which has been adapted and/or scaled based on DRESS information in the web page definition and the target area size.

As shown in FIG. 6, each of the blocks in the web page of screen shot 604 have been summarized with content references 606. In the example, the content references 606 are text summarizations in the form of hyperlinks. As discussed above, if a user selects one of the hyperlinks, an unsummarized version of the corresponding block will be rendered. Although the adapted web page in screen shot 604 includes content summaries of all the block contents, in other situations fewer than all the blocks may be summarized. Thus, in general, using DRESS information, some blocks will be summarized and some blocks will not be summarized, in accordance with the solution to the layout optimization rule in equation (5).

An Exemplary Operating Environment

Figure 7:
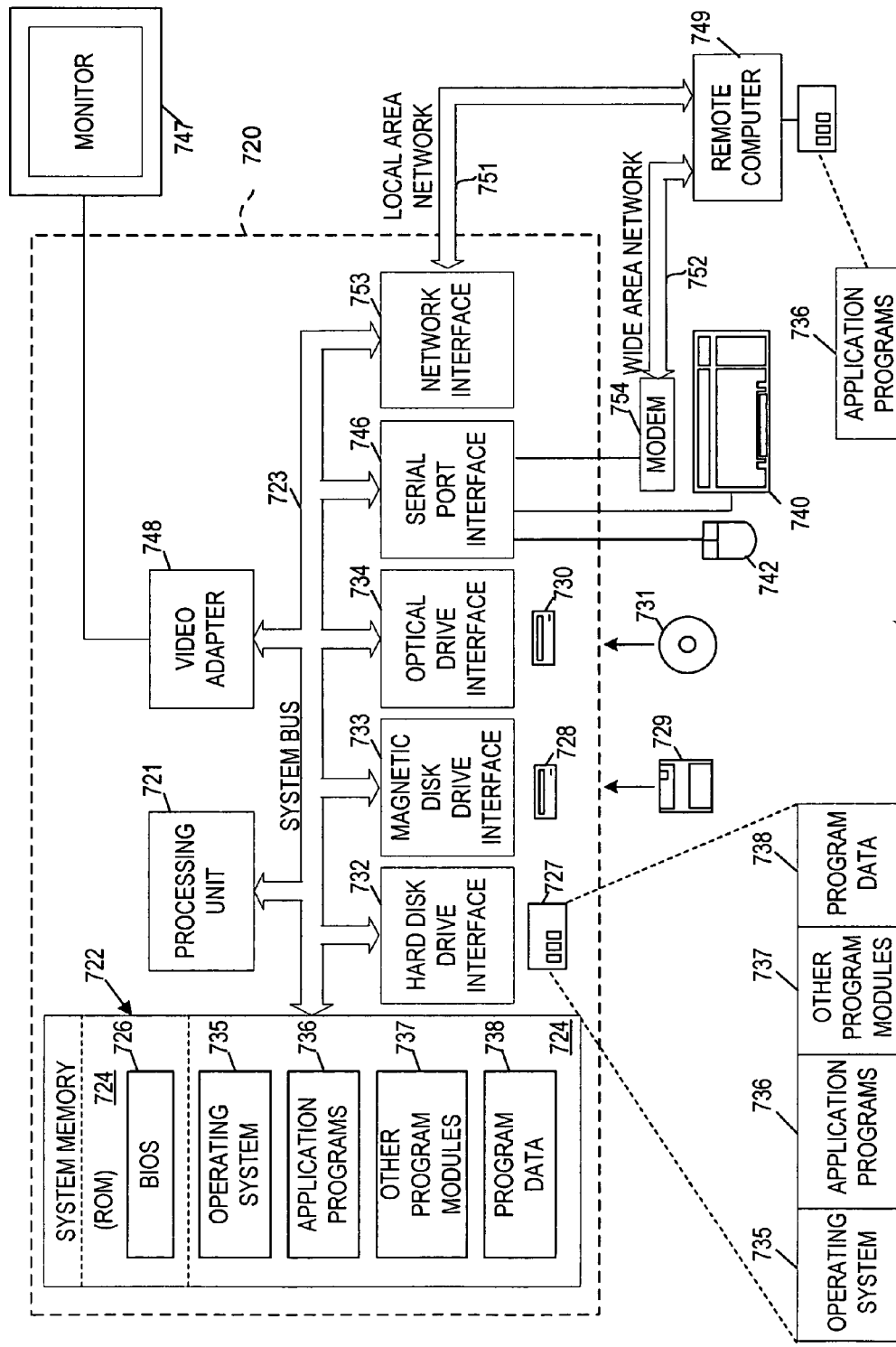
FIG. 7 illustrates an exemplary system that provides a suitable operating environment to author and/or render a web page according to adaptable and scalable document representation.

FIG. 7 illustrates one operating environment 710 in which the various systems, methods, and data structures described herein may be implemented. The exemplary operating environment 710 of FIG. 7 includes a general purpose computing device in the form of a computer 720, including a processing unit 721, a system memory 722, and a system bus 723 that operatively couples various system components include the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724. The computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. At least one of the application programs 736 is a scheduling application operable to control scheduling of events or tasks that have resource requirements.

A user may enter commands and information into the personal computer 720 through input devices such as a keyboard 740 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port, or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as remote computer 749. These logical connections may be achieved by a communication device coupled to or a part of the computer 720, or in other manners. The remote computer 749 may be another computer, a server, a router, a network PC, a client, a peer device or other common network node, and typically includes many or all of the elements described above relative to the computer 720, although only a memory storage device 750 has been illustrated in FIG. 7. The logical connections depicted in FIG. include a local-area network (LAN) 751 and a wide-area network (WAN) 752.

The LAN 877 and/or the WAN 879 can be wired networks, wireless networks, or any combination of wired or wireless networks. Such networking environments are commonplace in office networks, enterprise-wide computer networks, intranets and the Internal, which are all types of networks.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

Various methods are illustrated herein as being implemented in a suitable computing environment. Various exemplary methods are described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including hand-held devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A method comprising:
   receiving a web page definition at a computing device, the web page definition having a slicing tree describing an arrangement of a plurality of blocks in the web page;
   selected a combination of the plurality of blocks to be adapted such that information fidelity is maximized according to the expression:

$$IF(P) = \sum_{B_i \in P} IMP_i \cdot IF_{B_i},$$

where $IMP_i$ is a value representing importance of block $B_i$, $IF_{B_i}$ is a value representing information fidelity of block $B_i$, and $IF(P)$ is the total information fidelity of the web page; and rendering the web page on a display screen according to the slicing tree.

2. A method as recited in claim 1 wherein the web page definition further includes block property data associated with one or more of the plurality of blocks.

3. A method as recited in claim 2 further comprising scaling one or more of the plurality of blocks according to a function of display screen size and the block property data.

4. A method as recited in claim 2 wherein the block property data comprises:
   - an importance field;
   - a minimal perceptible size field;
   - a minimal perceptible height field;
   - a minimal perceptible width field;
   - an adjustability field; and
   - an alternative field.

5. A method as recited in claim 4 further comprising determining a scaling number using a capacity based ratio algorithm.

6. A method as recited in claim 1 further comprising summarizing one or more of the plurality of blocks.

7. A method as recited in claim 1 further comprising associating a scaling factor with one or more of the plurality of blocks.

8. A method as recited in claim 1 further comprising generating a binary tree having a plurality of nodes, wherein each node corresponds to a combination of the plurality of blocks.

9. A method as recited in claim 8 further comprising maximizing information fidelity subject to:

$$\sum_{B_i \in P'} \text{size}(ALT_i) + \sum_{B_i \in P'} MPS_i \leq \text{Area},$$

where $ALT_i$ is an adapted representation of block $B_i$, $\text{size}(ALT_i)$ is a function that returns the size of $ALT_i$, $MPS_i$ is a value representing a minimum perceptible size of block $B_i$, and Area is a value representing the size of the target area in which the web page is rendered.

10. A method as recited in claim 1 further comprising scaling one or more of the blocks to maximize information fidelity subject to a target area on the display screen.

* * * * *